Oct. 7, 1969  A. SCHMIDT  3,471,363
PROCESS AND APPARATUS FOR MECHANICALLY COMPACTING A CONTINUOUS
WEB TO EFFECT STRETCHING OR SHRINKING THEREOF
Filed Sept. 17, 1965  11 Sheets-Sheet 1

INVENTOR
ADOLF SCHMIDT
BY Dicke + Craig
ATTORNEYS

INVENTOR
ADOLF SCHMIDT
BY Dicke + Craig
ATTORNEYS

INVENTOR
ADOLF SCHMIDT
BY Dicke + Craig
ATTORNEYS 3,471,363
PROCESS AND APPARATUS FOR MECHANICALLY
COMPACTING A CONTINUOUS WEB TO EFFECT
STRETCHING OR SHRINKING THEREOF
Adolf Schmidt, Nippesstrasse 14,
Duren, Rhineland, Germany
Filed Sept. 17, 1965, Ser. No. 487,975
Claims priority, application Germany, Sept. 17, 1964,
Sch 35,794; Aug. 17, 1965, Sch 37,566
Int. Cl. D21h 5/24
U.S. Cl. 162—197                            17 Claims

ABSTRACT OF THE DISCLOSURE

A process for stretching or shrinking a continuous web including the steps of pressing the web against a flexible deformable band, moving the band together with the continuous web, successively increasing or decreasing, in step-wise manner, the pressure exerted on the band, thus causing the band to expand or contract, respectively, in a direction transverse to the direction of travel and causing a corresponding stretching or shrinking of the continuous web in the same direction. The present invention also contemplates apparatus for effecting this process, which apparatus includes a pressure cabinet, one wall of which is formed by a flexible deformable band, the band being designed for deformation in a direction transverse to the path of travel of the continuous web, but not in the direction coinciding with the path of travel, the pressure cabinet including a number of separate pressure chambers and a pressure control system which provides for successively higher or lower pressures in each excessive pressure chamber.

---

The invention relates to a process for stretching or shrinking a line of material (continuous web) by the use of a flexible stretchable band. This band is movable longitudinally with the line, may be pressed against the line and undergoes flexible deformation in the transverse direction. The invention also concerns the equipment for the carrying out of the process.

In the manufacture of paper sheet lines and lines of similar material, the tensile forces applied in the direction of running cause alteration of the strength properties. The material lines therefore have varying properties in the longitudinal and crosswise directions. Attempts have been made to overcome this disadvantage by incorporating width-stretch rollers into the pressing and drying machine sets with the object of stretching the paper line in its crosswise direction. The effectiveness of such width-stretch rollers is, however, slight, because the width stretch forces can only be transferred onto the paper line by friction and because, for the width-stretch process, only the relatively small path provided by the passing over of the width stretch roller is available. A further failing of this process is the fact that width-stretching in paper lines is effective only in a region in which the paper is still relatively wet. It has been shown by experience that a strengthening of the paper by stretching is only possible when the paper is very much drier.

Attempts have been made to deal with the width shrinkage of paper lines bound up with drying (during passage through the drying machines) by applying extraordinary tension to the felt layer surrounding the drying roller. Apart from the fact that no width stretching is possible by this process, the path between the drying rollers had always the possibility of shrinking, and thus a part of the effort made on travelling around the drying roller was made ineffective.

For width-stretching of synthetic materials, a process which is well-known involves the fitting of a movable chain on each of the side edges, whereby the two chains would be drawn somewhat apart from each other in the moving direction of the material line. Such a process is, however, only possible for such materials which have already been brought to a high tear-resisting strength and thus it cannot be used in the manufacture of lines of sheet paper.

Furthermore, in this process, the material lines are stretched much more at the edges than they are stretched in the middle regions, so that it is not applicable for even width-stretching.

Apart from the width-stretching problem, the general problem arises in the manufacture of lines of paper, of shrinking a paper line in two directions at right angles to each other, while finally, for certain strong papers it is also desired to shrink the paper line only, or at least preferably, in one direction. Here corrugated grooves run at right angles to the preferred direction of shrinking. For the corrugating of paper lines, a process long known makes use of a mechanical impression of the previously smooth paper line, impressing it with the wavy form by blowing compressed air from below on to the paper line passing over a corrugated roller. In a more recent process, a flexible stretchable band is used. This band is guided over a roller which also takes up the paper line, and, at first point of contact they are both guided on to the roller together by means of a radially set press-on guide roller of a similar device. The flexible stretchable band is pressed against the paper line and the (main) roller in such a way that the band is in considerable stretched condition when it thus meets the paper line. During continued further common movement of the paper line and band over the roller, the paper line should shrink again with the now shrinking band.

While in the first-mentioned corrugating process, it is a disadvantage that the corrugating can only be carried out by involving stretching of the paper material, the disadvantage in the second process mentioned is that it can only be relatively effective through here at first a certain co-stretching of the paper line with the band is caused. The disadvantage has been partly corrected by the use of an inflatable rubber hose used as a band in relation to which the roller rotates at somewhat greater speed so that the rubber hose is stretched somewhat earlier over the roller. This band shrinks considerably more at the exit side of the delivery position of the paper line that it is expanded at the first contact with the paper line. Even this process is disadvantageous as a sudden high shrinkage of the hose surface occurs, but this is only poorly transmitted on the paper line because the pressing is too weak.

The invention is based on the task of avoiding all the above faults and especially, even with material lines relatively susceptible to tearing, to make possible not only an effective shrinking but also a predeterminable degree of stretching, e.g., width stretching in those sections of production in which it exerts the most favorable influence on the physical properties of the materials.

The set task of the invention is accomplished through the pressing of the flexible stretchable band on to the material line during common movement forward, and is strengthened or weakened (as the case may be) in several immediately consecutive stages.

Such multi-stage presses, using one and the same appliance effects a wide stretching or shrinkage even with delicate materials—in spite of the small size of the individual stretching and shrinking stages. This is attained to a great extent due to the fact that the individual stretching/shrinking stages follow one another immediately.

In accordance with a selective arrangement of the inventive process, the material line is taken up between two flexible stretchable bands which travel along with the line in longitudinal direction and the degree of pressing of the bands against the material line during the common further movement forward, is several times strengthened or weakened, as the case may be, in stages. This arrangement has a special significance in the case of very delicate paper lines, as for this any sliding movement of a line in relation to a sub-line, a drying cylinder or the like, is totally unnecessary.

A notable reduction of the pressure force exerted on the band, and thus an advantageous reduction of the required flow-medium pressure (e.g. compressed air pressure) with corresponding decrease of sealing costs may be achieved at the position of the pressure cabinet when the flexible stretchable band (in line with a further arrangement of the invented process) is subjected, during pressure impact, to a known cross-stretching force which supports the width stretching and is applied at the edges of the band.

A suitable applicant for carrying out the above process of the invention—in conjunction with an endless flexible stretchable band which is pressed against the material line between two return rollers—is characterized by a pressure cabinet arranged between the two return-rollers, and which has, on the side of the material line facing the working edge, several pressure chambers. The chambers are open toward the working edge, but are sealed off from each other. They are fitted with pressure controllers for increasing and lowering pressure in moving direction of the working edge.

It is of special advantage if the pressure cabinet, as it is designed for another form of the invention, is formed as a half-cylinder fitting a drying cylinder and makes use of a known form of support at that part of the material line next to the working edge.

If it is simply required to effect a cross-wise stretching of the material line, a flexible stretchable endless band is used. This in accordance with a further arrangement of the invention makes use of cords or cables, worked into the band. Circular endless cords or cables not stretchable in their longitudinal directions, are worked into the crosswise direction of the band, near to and parallel to each other but independent of each other. Or a cable or cord not stretchable in longitudinal direction, is worked into the band in the form of a gradually ascending coil. The rubber material of such a band in the various pressing applied, can only spread out at right angles to the longitudinal direction of the band whereby the material line as well is, for practical purposes, stretched only in its crosswise direction. By a reversed application of such a flexible stretchable belt there results an especially effective transverse shrinking of the material line.

In conjunction with the invention's crosswise stretching of the flexible stretchable band, this band according to a further arrangement of the invention extends beyond the breadth of the material line on both sides, and is strengthened at both its edges by added strips on to which grip (in the width stretching or width shrinking zone of the band) pairs of smaller diameter rollers from two roller guide rails. The distance separating the roller guide rails is adjustable. They may also be arranged stationary on the appliance stand, so that the expense involved here can be kept relatively low.

In order to improve the sealing of the pressure cabinet in this form of construction, there can be fitted, according to another arrangement of the invention, in the region of the pressure cabinet and on both sides thereof a sealing band formed as an endless band running with the flexible stretchable band and which according to a further arrangement of the invention can run within the pressure cabinet zone between the hose and the flexible stretchable band.

The sealing problem is best solved when every pressure chamber of the first mentioned inventive form of construction is provided with an airtight, pocket-shaped elastomer container which, for the greater part fills the pressure chamber and which can be subjected to pressure at its interior by a controllable pressure flow. This is supported at least by a friction reducing intermediate layer where the flexible stretchable band moves past it.

In such form of the appliance there are absolutely no sealing difficulties to be feared, but care has to be taken that the frictional resistance between the elastomer containers and the flexible stretchable band is kept as low as possible.

An especially effective reduction of friction is possible in the last mentioned construction of the invented appliance, if, according to further design forms of the invention, the intermediate layer consists of a movable pressure plate fitting the pressure chamber opening and having chambered side edges. The plate is guided to the chamber walls running at right angles to the moving direction of the band. At the side of the band facing the pressure boxes, at least in the zone of the pressure cabinets an accompanying running endless belt is arranged, against which the pressure plates are directly or indirectly supported.

Again an effective reduction of friction is possible here, if on the outside of each pressure plate at least two rollers are positioned near each other with their axles square to the moving direction of the stretchable belt and rolling parallel at the same time to the band plane, transmitting pressure onto the running belt with the least possible friction.

An especially advantageous application of the invention results from a further adaptation of the invention using a pressure cabinet fitting a drying cylinder in dimensions (having the same dimensions as a drying cylinder). This replaces one of the drying cylinders in an otherwise unaltered existing paper making machine and fits into the existing frame of this machine.

A further especially advantageous form of the invention (especially in an appliance having a pressure cabinet corresponding in dimensions to a drying cylinder) is provided with a moisture absorbing layer at the side facing the material line, and, at the position of the returning working edge of the band, is provided with a device for drying the layer.

Finally, other arrangements of the invention concern design details of the various forms taken by the invention.

The invention is illustrated by examples given in drawings as follows.

In the following description of the various forms of the invention especially the four such forms illustrated in FIGURES 1, 7, 9 and 12, the same or similar parts are numbered by the same reference number, but this number is increased progressively by 100.

The appliance corresponding to the first design example, shown in the FIGURES 1 to 6 serves, in its application as described, for the width stretching of the material lines. It consists of two caterpillar tracks 2 taking up the horizontally led paper line 1 between line. These caterpillar tracks are of similar design and have, between their return-rollers 3, a pressure cabinet 4 and a flexible stretchable band 5. Each pressure cabinet 4 (at which the fitted return rollers 3 with their shafts 6 are positioned and are adjustable in the direction of movement of the paper line 1) has, toward the working edge of the band 5 facing the paper line 1 and in the direction of movement of this working edge, a consecutive series of pressure chambers 7, 7a, 7b, 7c and 7d, which are open on the working edge face, but are closed at their partition walls 8 and their side walls 9 as far as the working edge is concerned by means of sealing lips 10 or by sealing bands 11 (FIGURE 2) made of rubber. The first pressure chamber 7 and the last pressure chamber 7d of each pressure cabinet 4 are sealed in the direction of the respective return roller 3 by a futrher sealing lip 12.

Figure 1:
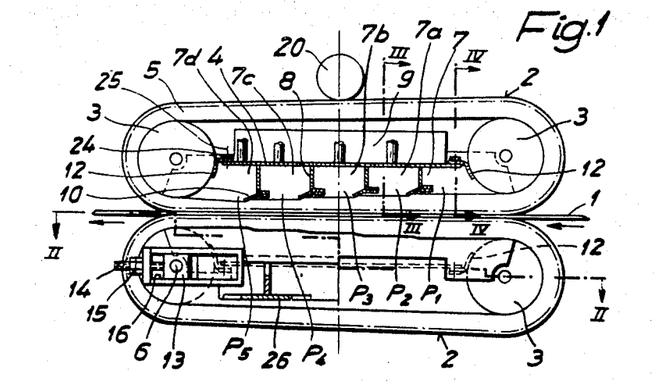
FIGURE 1—an appliance for carrying out the inventive process in perpendicular longitudinal section taken along line 1—1 of FIGURE 4.
Figure 2:
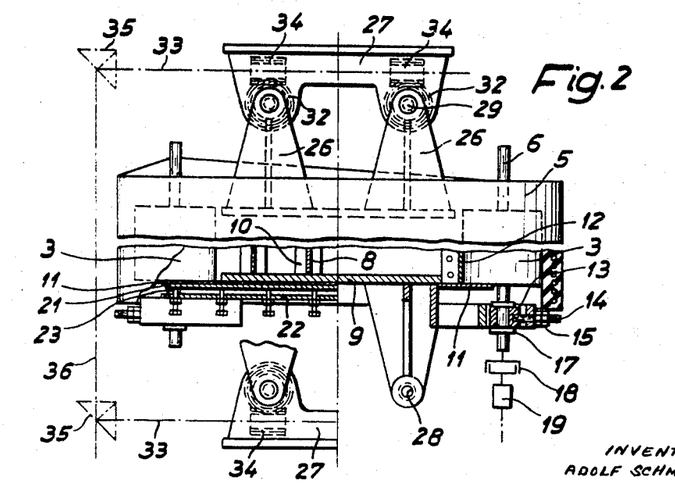
FIGURE 2—the same appliance of FIGURE 1 partly in section and taken along line II—II of FIGURE 1.

As may be seen from FIGS. 1 and 2, the shafts 6 of the return rollers 3 each have a bearing 13 on each side of the roller; this is held by a spindle 14 and nuts 15 within a horizontal guide unit 16. The bearing 13 may be moved and fixed in a set position in the longitudinal direction of the band 5. One of the two and either of the two return rollers 3 of each caterpillar track 2 can be connected by a coupling 18 to drive 19 and can be driven by this. Also, on the returning working edge of each caterpillar track, a tensioning and adjustment pulley 20 for any degree of pre-stressing against the band 5 is provided for preventing the band from getting out of adjustment and to prevent any possible side slip. In the drawing, such a pulley 20 is shown only above the caterpillar track 2. The clamps 21 serve for tightening the sealing bands 11 against the side walls 9 of the pressure cabinet 4. Clamping against the sealing bands 11 is done by the screws 23 of the sealing frame 22. The sealing lips 12 can be firmly clamped to pressure cabinet 4 by clamps 24 and screws 25 in a similar way. On the same principle, but not especially shown here, the sealing lips 10 are clamped tight to the crosswalls 8 of the pressure cabinets 4.

Each pressure cabinet 4 carries two cantilevered brackets 27, supported by two pairs of support arms 26 in a manner described more fully in the following. Each pair of support arms is arranged one on each side of the two caterpillar tracks 2. Thus the support arms 26 of the upper and lower pressure cabinets 4 are always exactly positioned one above the other and have, at their free ends in vertical direction to each other, the aligned thread bores 28. As may be seen from FIGS. 3 and 4, the two support arms 26 are each connected together in a turnbuckle manner by a vertical spindle 29 at their counter running ends. The spindle 29 is rotatable in its middle zone at the cantilever 27 and is at the same time made axially immovable by the thrust bearing 30. The thrust bearings 30 are held on the correspondingly lowered spindle 29 by the thread rings 31. Under cantilevr 27, each spindle 29, has a worm wheel which grips into the horizontally travelling worm 34 with its shaft 33. Thus, on each side of the appliance described there is a shaft 33 in fixed bearings, in which are the two worms 34. Both shafts 33 at one of their ends are coupled together via bevelled gear 35 and a connecting shaft 36. Thus, they may be set in motion together by an ordinary form of drive not shown here.

The bands 5 of the two caterpillar tracks 2 consist of a relatively soft rubber, into which cables 37 are worked in the longitudinal direction of the bands, evenly spaced and independent of each other. The cables, which may be of steel, make the bands unstretchable in the longitudinal direction. If a force is applied to the bands, the rubber of the bands can stretch in crosswise direction, whereon the mutual distance or spacing of the cables 37 and the width of the band itself increase accordingly. In order to bring such force to bear on the bands 5, the pressure chambers 7, 7a, 7b, 7c and 7d are used, each of which can be worked preferably by a gaseous pressurizing agent via a pipeline 38 which may be seen in FIG. 5. According to FIG. 5 each of the pressure chambers of the two pressure cabinets 4 arranged one above the other, are joined together by the line 38 and at the same time by a pressure controller 39. All pressure controllers 39 are again connected on the inlet side, via a common pressure pipeline 40 to a main pressure controller 41 which, in turn, is connected to an ordinary pressure supply pipeline 43 via a shut-off valve 42. Finally, between the shut-off valve 42 and the main pressure controller 41 on pressure pipeline 40, there is fitted a lubrication device 44, through which glycerine or other suitable material may be ejected into the gaseous pressure medium. The glycerine is supplemented with an addition of up to 10% molybdenum disulphide ($MOS_2$) and enters the stream of gas in a regulated manner in the form of drops. The appliance works as follows:

After the paper line 1 is guided through between the two caterpillar tracks 2 travelling away from each other, the two shafts 33 are set in motion, e.g., from the direction of shaft 36. This causes the two caterpillar tracks to move in opposition to each other in an even manner via the worms 34, the worm wheels 32, and the spindles 29 and the support arm 26 until the edges facing each other (calling "working edges" owing to the working principle of the appliance) lie on the paper line 1. Subsequently, the gaseous pressure medium, preferably compressed air, is fed to the various pressure chambers 7, 7a, 7b, 7c and 7d via the various pressure controllers 39. Here the pressure controllers 39 are so set that the consecutive pressure chambers (in the moving direction of the paper line) are subjected to progressively increasing pressures $p_1$, $p_2$, $p_3$, $p_4$, and $p_5$. In the FIGURES 5a, 5b, 5c and 5d the pressure chambers 7, 7a, 7b, 7c and 7d are subjected each to a suitable pressure in conjunction with the stressed paper line 1 (stressed at working edge). The figures show how the working edge of the band 5 is pressed increasingly against the paper line 1 by the force of the compressed air and is thereby broadened. This stretching between the working edge also stretches the paper line 1, as shown in FIG. 5, from a width $B_1$ to a width $B_2$.

Figure 6:
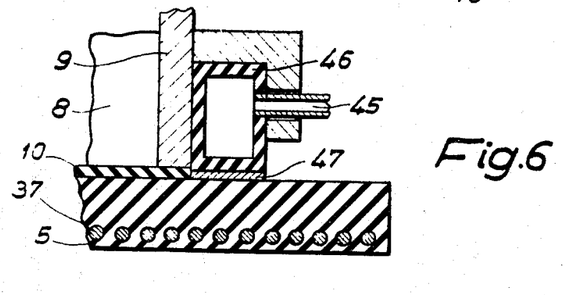
FIGURE 6—a detail view of a portion of the apparatus illustrated in FIGURE 3.

The modification as shown in FIG. 6 illustrates an inflatable hose 46 instead of the sealing band along the outside of the side wall 9 of a pressure cabinet. The hose connects with a pipeline 45. The hose 46 can be fitted with a wear preventing lining of e.g., teflon or nylon, on the side facing the band 5.

The sealing bands 11 and also the hoses 46 extend in horizontal direction of the appliance up to the front face surfaces of the relative return rollers 3, so that the first and last pressure chambers 7 and 7d are in each case sealed toward the outside. Thus the return rollers 3 are of such length in each case that their front surfaces finish exactly with the outer surfaces of the side walls 9 of pressure cabinet 4. Here the front surfaces of the return rollers 3 (for reduction of the friction against the sealing clamp 11 of the hoses 46) can be additionally supplied with a low surface friction coefficient, i.e., they may be highly chromed or provided with a sprayed-on or glued-on layer of teflon or nylon.

Figure 7:
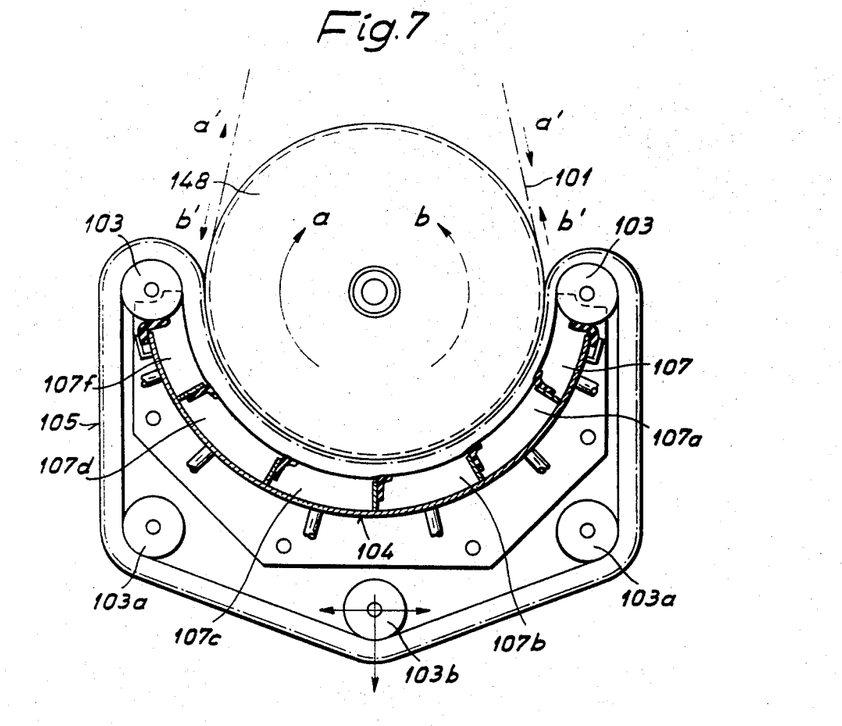
FIGURE 7—a schematic view showing a partial cross-section of an additional embodiment for carrying out the invented process.

In FIG. 7, illustrating a second modification of the same appliance, the appliance is provided with only a single flexible stretchable band 105, which half surrounds a drying cylinder 148 with one part thereof. At the two opposite ends of the drying cylinder 148, the band is led over the return rollers 103 and its remaining part is led over further return rollers 103a and 103b in such a way that it encloses a somewhat semicircularly shaped pressure cabinet 104.

The pressure cabinet 104, the return rollers 103, 103a and 103b are the drying cylinder 148 may be fitted in the usual way, e.g., by their axles, to a common stand not shown in the drawing. Of the return rollers, the return roller 103b is, at the same time, formed as a tensing roller which is displaceable in the directions of the arrows shown in FIG. 7 (in 103b). It can thus give the band a corresponding pre-stress.

The drying cylinder 148 is highly chromed on its cylindrical surface or is covered with a layer of another medium, e.g., sprayed or glued on teflon or nylon.

The pressure cabinet 104 shows in similar way to the pressure chambers 107, 107a, 107b, 107c, 107d and 107f which open radially toward the band 105 and are also sealed on the outside. The details of the subdivision of the sealing, and also the supplying of the individual pressure chambers correspond with those of the first embodiment of the invention described above so that a repetition of these details need not be given here.

As may be seen, the pressure chambers 107f, 107d, 107c, 107b, 107a and 107 are filled at progressively increasing pressures in this order, so that, in the given direction of the said chambers, there results a visibly decreasing wall thickness of the band 105, which at the same time has a readily adjustable increasing longitudinal direction, which exists also in the axial direction of the drying cylinder 148, this not being shown in the diagram. The corresponding lengthening of the whole band 105 is compensated by automatic displacement of the prestressed return roller 103b.

If the drying cylinder 148 is driven so that it rotates in clockwise direction as indicated by the arrow $a$, whereby also the material line 101 and the band 105 is taken in the same direction (arrow $a$) then the material line 101 runs on to drying cylinder 148, between this and the band 105, at a position where the band 105 is at its widest stretched condition.

During the common movement between drying cylinder 148 and the band 105, the band loses tension according to the decreasing pressures in the pressure chambers 107a, 107b, 107c, 107d and finally 107f in such a way that, for example, it is completely untensed in the zone of the pressure chamber 107f. With the progressive untensing of the band 105 is bound up a corresponding contracting of its surface facing the drying cylinder 148 which is pressed against the material production line 101. As the material line 101 is nearly friction-free in the drying cylinder 148, it is taken up with the band 105 now contracting, and undergoes a corresponding shrinkage.

If the drying cylinder 148 is made to rotate in the opposite direction as indicated by the arrow $b$, i.e., counter clockwise, and the material line 101 is moved accordingly in the direction of the broken line arrow $b$, then the material line (at pressure chamber 107f) runs into the narrow passage between the drying cylinder 148 and the band 105 where the band has not yet undergone stretching or has undergone only slight stretching. On the continued movement of the material production line 101 around the drying cylinder 148 the material line is stretched with the progressively stretching band 105—because the very small friction coefficient between drying cylinder 148 and the material line 101 sets up no resistance worth mentioning to the costretching of the material line.

Figure 3:
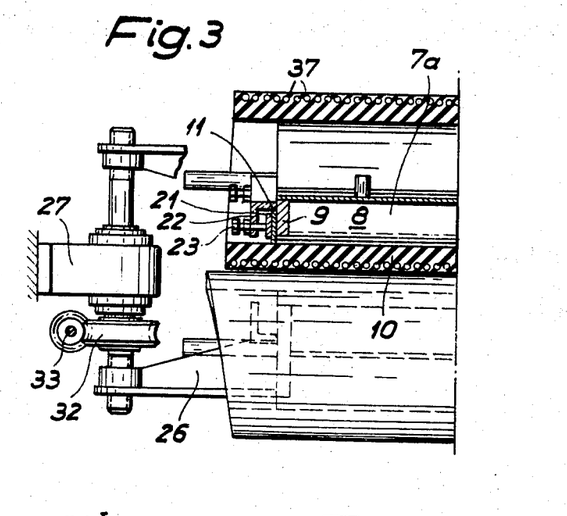
FIGURE 3—the appliance of FIGURE 1 party in section and taken along line III—III of FIGURE 1.
Figure 4:
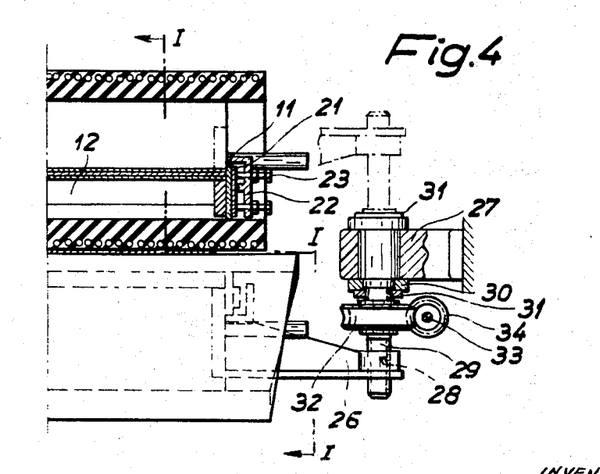
FIGURE 4—a front end view partly in section taken along line IV—IV of FIGURE 1.
Figure 5A:
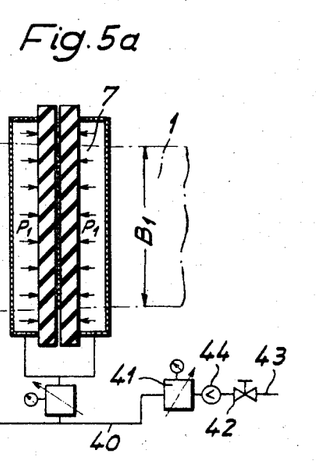
FIGURES 5a–5d—partial cross-sectional view of the four pressure chambers of the working appliance shown in FIGURE 1.
Figure 5B:
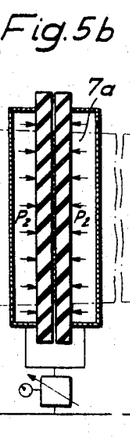
Figure 5C:
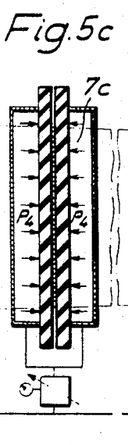
Figure 5D:
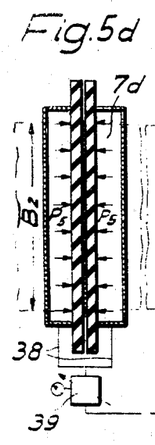

It is to be noted that the band 105 (including the example FIG 7) can be formed to suit special stretching or shrinking purposes. While, in the case of two-way stretching or shrinking where the band is designed to be evenly flexible and stretchable toward all sides, it can, where an exclusive width stretching or width shrinking of the material line is desired, be fitted with cables as illustrated in FIGS. 3 and 4 in conjunction with the first mentioned form of the invention. Should it be desired, on the other hand to give the band 105 preferably a longitudinal stretch, or a longitudinal shrinkage it can be fitted with the corresponding non-stretching cables in its cross sectional direction for preventing width stretching or shrinking.

In an application of the described process for shrinking, and especially width shrinking of the material line, it is especially advantageous that the material line, at position of entry into the appliance, should be held firmly at its initial breadth and should undergo no further pre-stretching.

Figure 8:
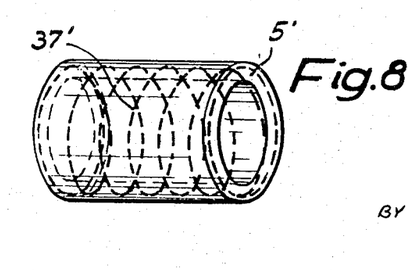
FIGURE 8—a perspective view of the apparatus of FIGURE 7.

In the variation (or modification) shown in FIG. 8, a coiled cable 37' passes through a flexible stretchable endless band 5', in longitudinal direction. The cable is coiled into the cross section of the band at small rate of climb. Compared to the use of many independent cables this method is simpler.

Figure 9:
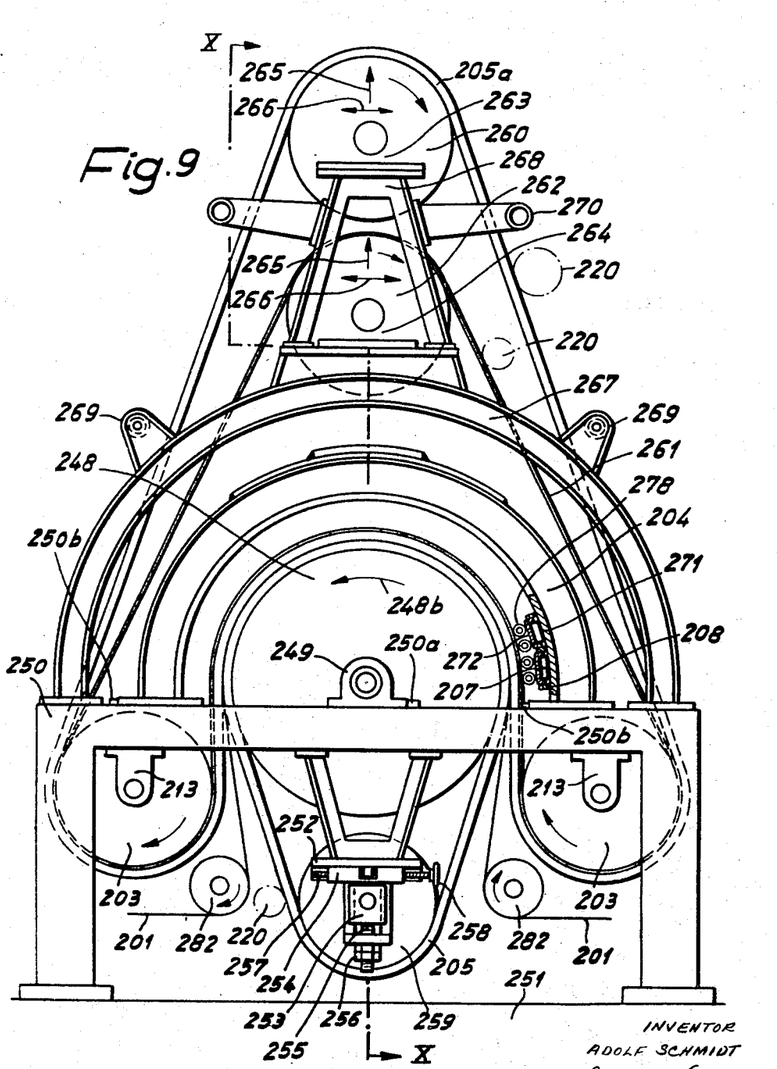
FIGURE 9—another form of the invention in side view incorporating pocket-like elastomer containers and designed for replacing a drying cylinder and for stretching or shrinking a material line.
Figure 10:
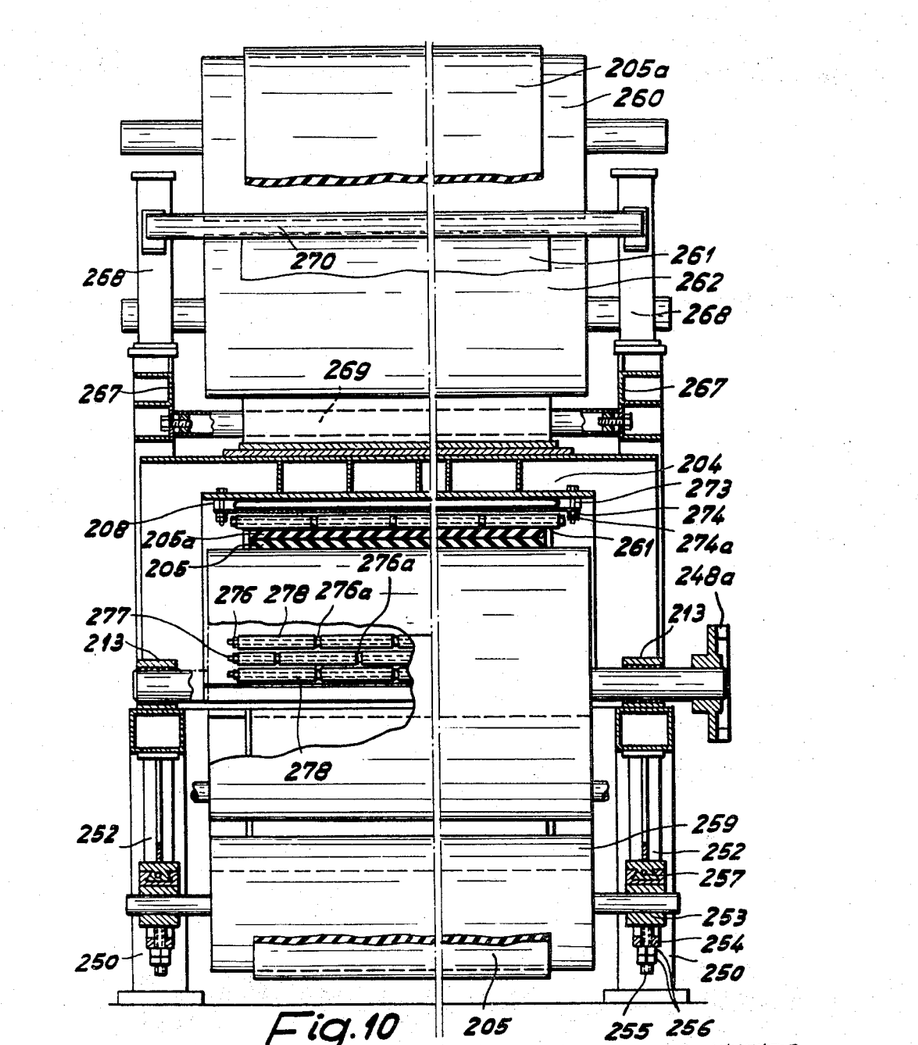
FIGURE 10—the appliance of FIGURE 9 in a plan view taken along line X—X of FIGURE 9.
Figure 11:
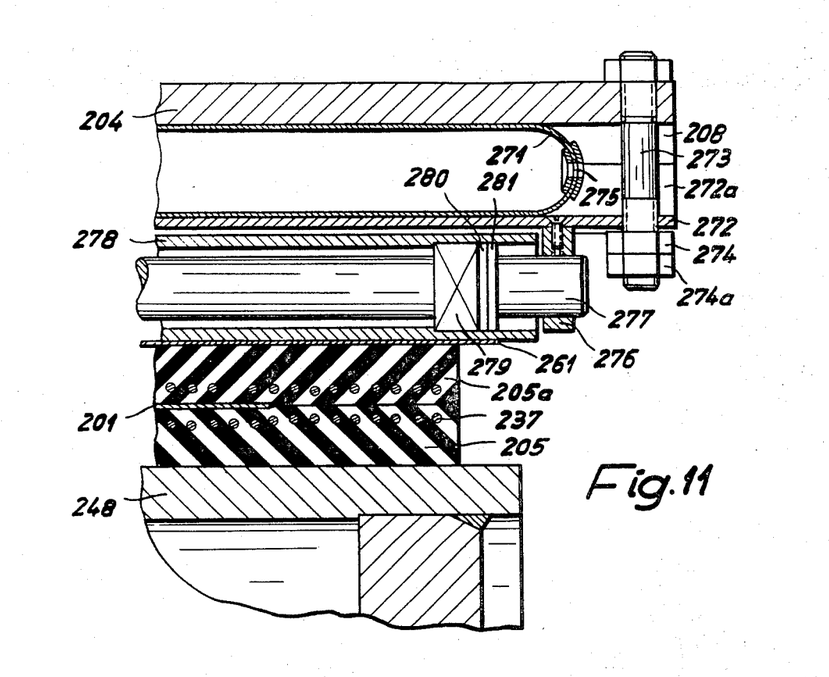
FIGURE 11—a part section of FIGURE 10.

In the third embodiment illustrated in FIGS. 9 to 11, the appliance for stretchinig or shriking a material line shows a cylinder 248 which is designed preferably as a drying cylinder and which has its bearings 249 in a frame 250. As the bearings 249 are stressed especially toward one side (according to the application of the appliance for width stretching of a material line still to be described in the following) they are supported in this side by the stop 250a. The frame 250 is also fixed to the usual foundation rails or similar foundation units.

Below the bearings 249 and on the frame 250 are provided two further bearings 253 with a tensioner each 252, both of which can be adjusted vertically and horizontally via an adjustment slot each 254, in which they can also be set in a desired position. The spindles 255 with nuts 256 are used for vertical movement and setting, while horizontal movement and setting square to the axis of cylinder 248 is done by the setting spindles 257 each having a handwheel 258.

In the bearings 253 is a return roller 259 with an axis parallel to cylinder 248 for a lower flexible stretchable endless belt 205 which, at its other end passes over the upper part of the cylinder 248. The belt 205 has cords or cables worked into its longitudinal direction as shown in FIG. 11. The cables or cords 237 are unstretchable in longitudinal direction and are worked into the width of the band parallel to each other, near each other, independent of each other and have the form of circular endless cords or cables or again, in the longitudinal direction unstretchable cord or cable is worked into the width of the band in coils having a small rate of climb. The cylindrical 248 has a highly polished hard chrome plating on its jacket or outer surface.

On the frame 250 there are further return rollers 203 each having bearing 213, parallel to the cylinder 248. These rollers are positioned one on each side of the common axial plane through cylinder 248 and return roller 259. The return rollers 203 serve for guiding an upper flexible stretchable endless belt 205a, which passes round the upper part of cylinder 248 still further above the lower belt 205. At the other end 205a the belt is conducted to return roller 260 which is also mounted on the frame 250 in a manner to be described more fully in the following. According to this embodiment, an accompanying belt 261 (which may be of steel) is also passed over the return rollers 203, and passes round the upper part of the cylinder 248 still further above the upper band 205a and is also passed over the return roller 262 which is also mounted on frame 250 but below the return roller 260. The term "accompanying belt" for the steel belt guided over the return roller 203 at the same speed as the upper band 205a is meant to convey that the band 205a undergoes displacement as may be seen in the description of the working principle which follows.

The adjustable bearings 263 and 264 serve for bearing the return rollers 260 and 262. They are similar in design to bearing 253 and are therefore not shown in detail here. The arrows 265 and 266 of FIG. 9 simply show their movability in tension and adjustment directions. Each bearing 264 is joined to and supported by frame 250 by a semicircular arch 267, while each bearing 263 on the arch 267 is set by a tensioner 268. The arches 267 and tensions 268 are rigidly joined to each other by the cruxes (cross members) 269 and 270.

On the frame 250 is further secured a semicircular pressure cabinet 204 surrounding the cylinder 248, the bands 205, 205a and 261 at a distance from them. The pressure cabinet has a large number of longitudinal ribbed walls 208 along its interior circumference, between each of which a pressure chamber 207 is formed. In each pressure chamber is an airtight pocket-like elastomer container 271 which can be subjected to a controlled stream of pressure. This container is covered at the chamber opening facing cylinder 248 by a pressure plate 272 which is movable at the rib walls 208, fits the opening and has chamfered edges 272a (FIG. 11). Each pressure plate 272 is supported against longitudinal displacement at both ends in each case by a guide stud fitted to each pressure chamber. The plate is movable along the stud. Each guide stud 273 has a thread and two nuts 274 and 274a at its free end extending beyond the pressure plate 272 forming one of the stops limiting the admissible path of pressure plate 272. Further, each container 271 is fillable with compressed air which may be controlled in its pressure and which passes via a pipeline connection 275 and a pipeline which is not illustrated.

Two shafts 277 are placed on the outside of each pressure plate 272 facing the cylinder 248 parallel to the axle of the cylinder and in the longitudinal direction of the plates. These shafts have several supporting bearings 276. As may be seen especially from FIG. 10, the further support bearings 276a (placed between the outer support bearings 276) of the two shafts 277 are arranged alternately and on the shaft 277, between each pair of support bearings 276 are shell-like (couch) rollers 278. As may be seen from FIG. 11 each couch roller 278 has a ball bearing 279 at its end, which toward the outside, is fitted with a seal or a gasket ring 280 and a securing ring 281.

The radial distance of the pressure cabinet 204 from the cylinder 248 is so set that the couch rollers 278 lie mainly pressureless just on the accompanying belt 261 when the pressure chambers 207 are not pressurized and the bands 205 and 205a are untensed. Also the frame 250 is fitted with further stops 250b as provided for in the example of form of the appliance and as described in the following application of the appliance.

On the frame 250 are finally positioned the guide rollers 282 which run parallel to cylinder 248 one on each side of the lower return roller 259. A paper line 201 to be treated is conducted over guide roller 282 to the cylinder 248 between two bands 205 and 205a. The appliance can take the paper line 201 away again.

The cylinder 248 can be driven, according to the design example in the rotating direction of the arrow 248b of FIG. 9 by way of a coupling 248a, whereby the return rollers 203, 259, 260, 262 and also the guide rollers 282 rotate in the direction indicated by the arrows in FIG. 9. Also, the filling of the various pocket-like consecutive containers 271 can, according to the design example be so regulated that they can be filled in progressively increasing quantities, causing increase in the pressing pressure of the couch rollers 278 against the accompanying belt 261 and thus against the bands 205 and 205a in the rotating direction of the cylinder 248. This step by step increase of pressure causes a correspondingly increasing pressing together of the flexible stretchable bands 205 and 205a which has the effect of increasing the band-width in a manner not specially shown. The paper line 201 (compare also FIG. 11) enclosed between the bands 205 and 205a is thereby stretched. It is to be noted that on any sidewise out of position running of bands 205, 205a and 261, a tipping of the outside couch rollers 278 is effectively prevented by the guiding of the pressure plates 272 along the guide studs 273.

Figure 12:
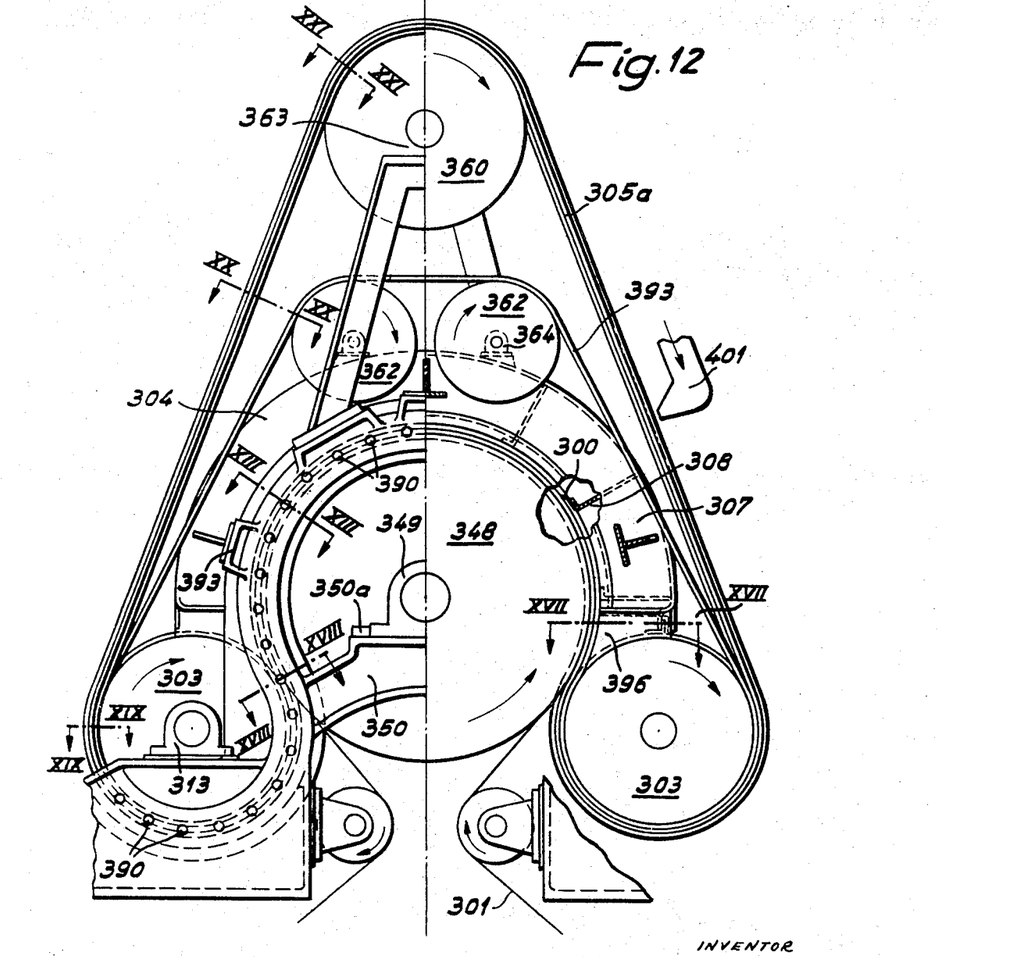
FIGURE 12—another embodiment of the invention using roller ways for width stretching of the flexible stretchable band.

In a further embodiment according to the invention of an appliance for width stretching or shrinking of a material line, illustrated in the FIGS. 12 to 22 the stop is only shown on the left hand side of the bearings 349 (see FIG. 12). This corresponds to the use of the appliance for the width shrinking of the paper line 301. Despite this, the appliance as drawn in FIGS. 12 to 22 will be described in its application for the width stretching of the paper line 301 in the following.

In this form of design, the paper line 301 surrounds the drying cylinder 348 directly, so that only one flexible stretchable band 305a is provided. This band passes round the cylinder 348 above the paper line 301 on the same principle as the band 205a of the previous form of design.

Figure 13:
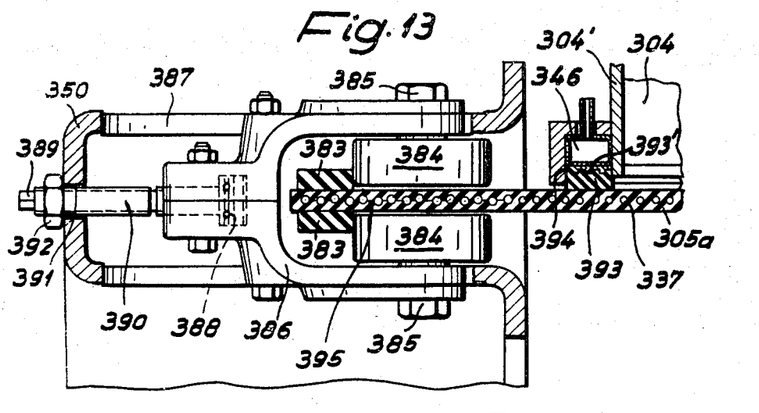
FIGURE 13—partial sectional view taken along line XIII—XIII in FIGURE 12 showing the roller way.
Figure 14:
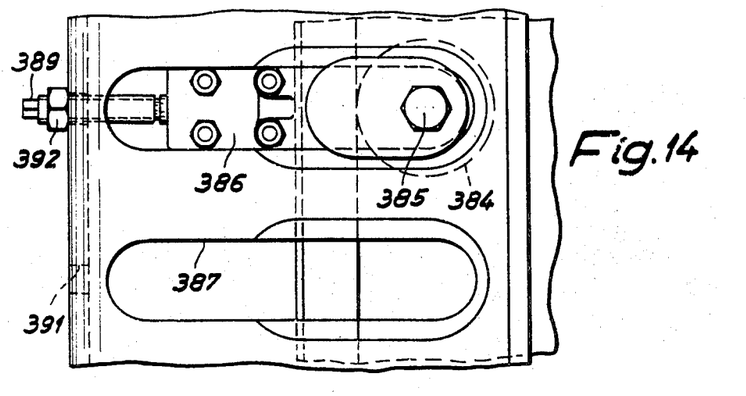
FIGURE 14—a side view of the roller way as in FIGURE 13.

The band 305a is, however, wider than the band 205a and extends over the pressure cabinet 304 on both sides as illustrated for example in FIG. 13. At each of its edges the band 305a is reinforced both sides by straps 383 (e.g., made of rubber) which are gripped by roller wheel pairs positioned at frame 350 in the width stretching or width shrinking zone of the band in a manner described in the following. The roller wheels 384 grip behind the sides of the straps 383 facing the band center as shown in FIG. 13.

Each pair of roller wheels is carried on bearing stud 385, which is positioned in a fork-like slide carriage 386. The slide carriage 386 grips over the edge of band 305a with its fork-like opening and is movable on the guide railway 387 of the frame 350 within the band plane and square to the band. A thread boring 391 of the frame 350 takes a spindle 390 at the top of the slide carriage 386. The spindle has a hexagonal nut 389 on its free end (according to its rotation and securing by the outer nut 392) and can be rotated by a roller bearing 388 and thus allows setting of the slide carriage 386 on the guide line 387.

As may further be seen from FIG. 12 there are a great number of sliding carriages at frame 350 extending along the whole length of the pressure cabinet 304 and even out beyond its running-out end, to represent only the spindles 390 which are shown in FIG. 12. In this way, the band 305a, in the whole of the pressure cabinet zone 304, can be given any desired width stretching which is settable by means of the spindles 390. In the case of a progressively increasing pressure impact on the band in the pressure chambers 307 of the pressure cabinet 304, starting from its running-in end, the width stretch of the band increases steadily up to a maximum at the pressure cabinet outlet and then it becomes less again.

In this embodiment the pressure cabinet 304 is secured to the frame 350 by several brackets 393.

As may be seen from FIGS. 12, 13, and 17 to 20 endless sealing bands 393 are passed over the cylinder 348 on either side (i.e., one on each side) of the pressure cabinet 304. These endless sealing bands surround the cylinder 348 above the flexible stretchable band 305a. The two sealing bands 393 are led up to parts 303' of the return rollers 303 and up to the return rollers 362 on bearings 364 over the frame 350 in the zone of the back of the pressure cabinet 304. By using one of these bearings in a way not shown but analogous to the use of the bearing 253 of the previous design, tensing of the sealing band 393 may be carried out.

The sealing band 393 has a labyrinth-like toothed cross section 393' on the side away from the band 305a, which fits the circumference profile of the part 303' of the return roller 303 and return roller 362. The fitted inflatable rubber hoses 346 at the two side walls 304' of the pressure cabinet 304 are each provided with a sealing band 394 on their sides facing the flexible stretchable band 305a. The sealing band 394 has a similar cross section profile into which the local sealing band 393 grips with its cross section profile 393'. In this way the sealing bands 393 in the pressure cabinet zone 304 can be conducted, securely sealed from the hoses 346, along the pressure cabinet 304. In order to keep the frictional resistance at the hoses 346 as small as possible, the individual pressure chambers 307 are fitted witth hoses inflated at the pressure of the particular chamber in each case.

In order that the flexible stretchable bands 305a does not become unnecessarily stretched crosswise over the paper line width at the places where the edges of the straps 383 extend, a woven insert 395 is made at the edge zone of the band to prevent such width stretching.

Figure 16:
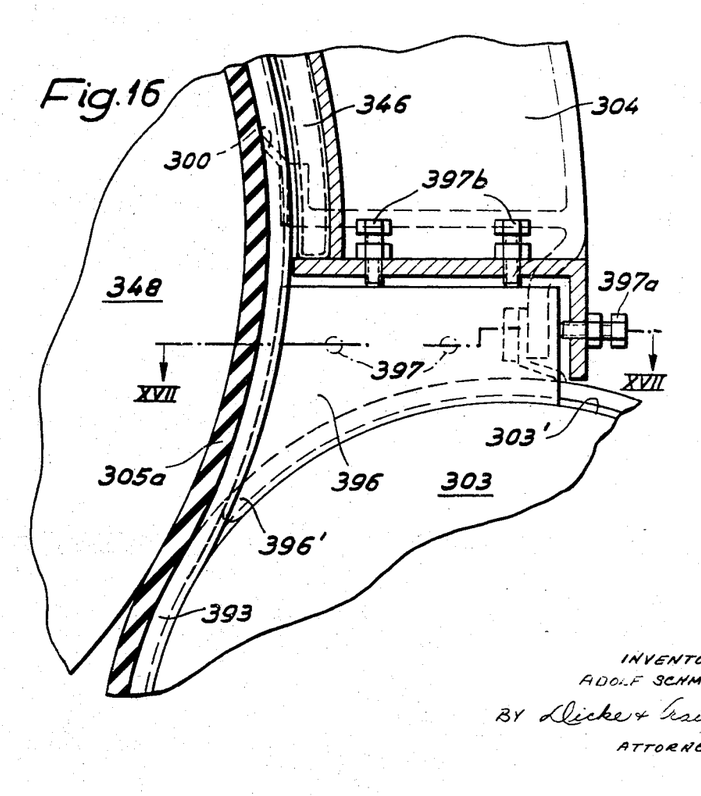
FIGURE 16—a section of FIGURE 12 taken along line XVI—XVI in FIGURE 17.
Figure 17:
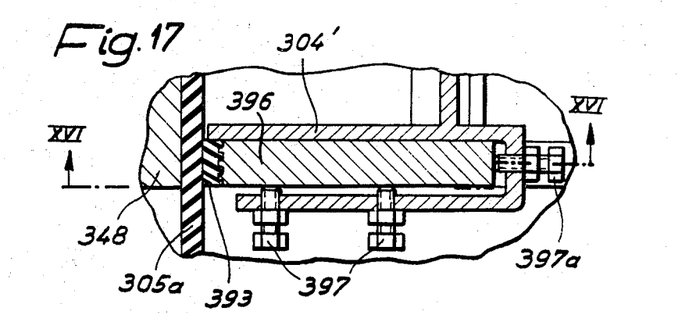

The pressure cabinet is sealed in the zone of its ribbed walls 308 from the band 305a by sealing lips 300. The first and the last pressure chambers of the pressure cabinet 304 are provided with a sealing wedge 396 toward the outside and in front of its side walls 304' (see especially FIGS. 16 and 17) which can be clamped into the slot between the return roller 303 (or its part 303') and the flexible stretchable band 305a. Each sealing wedge 396 runs within the plane of the one sealing band 393 and has, on both its edges, starting from its wedge edge 396' across section profile fitting the sealing band 393 and gripping into the sealing band's cross section or (as the case may be) gripping into the circumferential profile of the part 303'. Each sealing wedge can (as shown in FIGS. 16 and 17) be tightened against the sealing band 393 by the bolts 397a and against the return roller 303 by the bolts 397b in order to achieve the greatest possible sealing.

The working principle of the embodiment described is further explained with reference to FIGS. 15 to 21.

Figures 15, 18, 19, 20, 21:
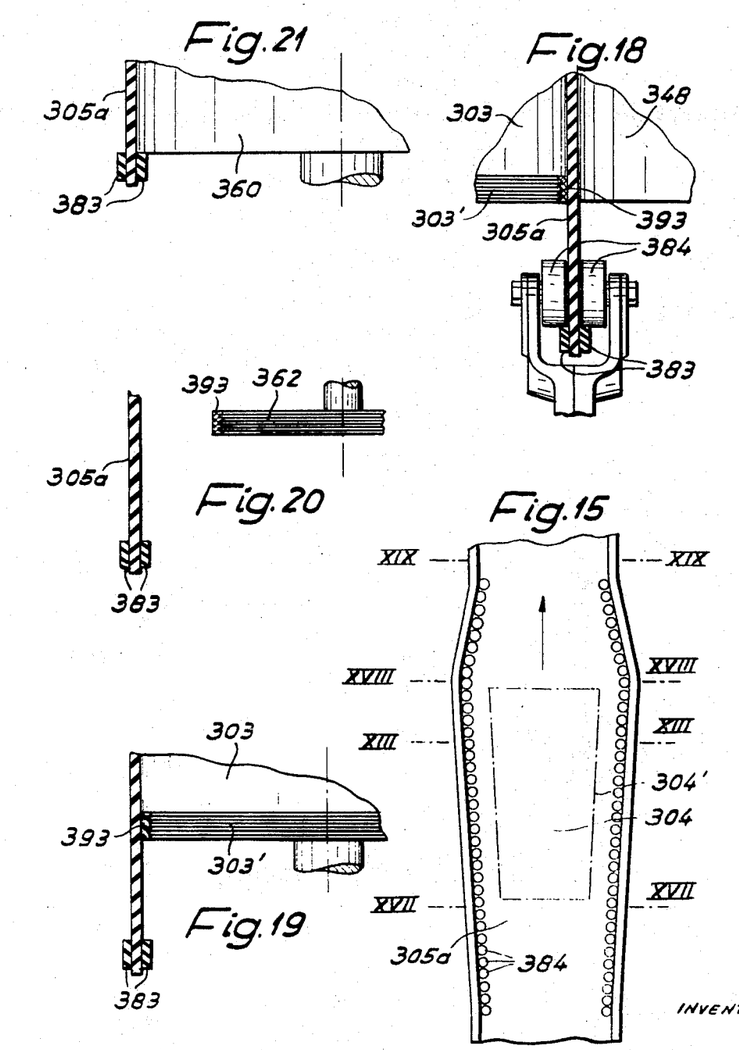
FIGURE 15—a diagrammatic illustration showing a crosswise stretching of the band in the pressure cabinet region.
FIGURES 17–21—various part cross sections, taken respectively, along lines XVII—XVII, XVIII—XVIII, XIX—XIX, XX—XX and XXI—XXI in FIGURES 16 and 12.

On rotating, the cylinder 348 and therefore also the return rollers 303 and 360 and the return rollers 362 in the direction of the arrows of FIG. 12, the flexible stretchable band 305a is moved forward steadily over the cylinder 348 and along the pressure cabinet 304. The degree of stretching of the paper line 301 is preset before its passage over the cylinder 348 and now the pressure chambers 307 of the pressure cabinet 304 are pressurized progressively increasingly in the direction of rotation of the cylinder 348. This pressurizing in the design example is done by compressed air. For supporting the required increasing width stretching of the band 305a the sliding carriages 386 (FIG. 13) with their roller wheels 384 are so set by the spindles 390 that the band 305a receives the desired widening in its cross wise direction. As shown in FIG. 15, the band 305a at the position XVII—XVII (compare also section line XVII—XVII of FIG. 12) first shows a slight crosswise broadening which corresponds to the pressure in the first pressure chamber 307 of pressure cabinet 304. On further movement, the band 305a (on the one hand by the progressively higher pressures in the pressure chambers 307 and on the other hand by the roller wheels 384 of the sliding carriages 386) also becomes increasingly stretched in crosswise direction, so that, at the position XIII—XIII (FIGS. 12, 13, and 15) it is already showing increased width which reaches its maximum at the end of the pressure cabinet; compare position XIII—XIII. In order that only the least possible friction force can occur between the sealing bands 393 and the flexible stretchable band 305a during this crosswise stretching, the pressure cabinet 304 has sidewalls 304' diverging in longitudinal direction.

Even after leaving the pressure cabinet 304, the band 305a still remains led by the roller wheels 384 which now (FIG. 15) however allow a steady contraction of the band, until at about the position XIX—XIX it regains its normal untensed width. FIGS. 18 and 29 readily show how the sealing bands 393 are guided in the zone of the return shows that the return roller 360 for the flexible stretchable band 305a has a length corresponding to the mutual distances of the strap 383 on untensed band.

Figure 22:
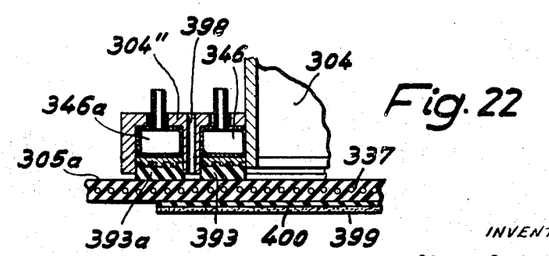
FIGURE 22—a detail cross section from FIGURE 13 with somewhat modified band and sealing design.

In FIG. 22 are shown two deviations of the appliance which are really independent of each other. As may be seen, two sealing bands 393 and 393a are provided near each other on both sides of the pressure cabinet 304, which in each case can be pressed against the band 305a. Between the two sealing bands 393 and 393a and a flange 304' holding the two hoses 346 and 346a of pressure cabinet 304, a ring or circular space is enclosed which is sealed relative to band 305a at both ends of the pressure cabinet and is connected via connection drilled passage 398 to a pumping point in a way not shown here. This sealing is provided for a hydraulic pressing of band 305a in order to avoid fluid leakage from pressure cabinet 304.

The second deviation of FIG. 22 concerns lining that side of the band 305a facing the paper line with a layer of felt 399, which is "pinned on" to an especially thin rubber band 400 which, in turn, is glued or vulcanized to the band 305a and is deformable with this. This pinning process is known. A large number of hooked pins are pressed through the thin rubber band at small distances apart into the neighboring fibres of the felt layer and are thus bedded into these. Experience has shown that the felt layer 399 so fitted to the rubber band 400 has remained firm in spite of its changing inshape with the band 305a.

The felt layer 399 which can be provided independently of the rest of the parts designed for the appliance, at Band 5, 105, 205, 205a, or 305a serves for absorbing moisture from the paper line 1 or 101, 202, 301 as the case may be. In order to dry the felt layer before its repeated run up to cylinder 348, there is as shown in FIG. 12 a jet 401 covering the whole width of the felt between the right return roller 303 and the upper return roller 360. Hot air can be blown against the band 305a through an ordinary source not specially shown here.

Figure 23:
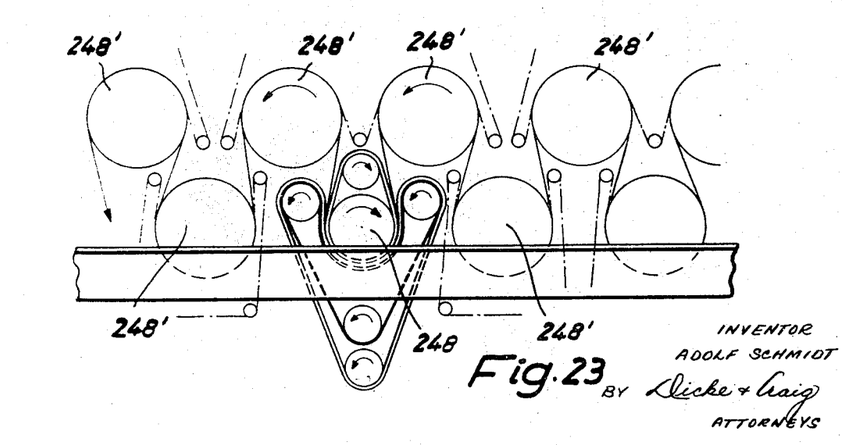
FIGURE 23—a side view of the appliance of FIGURES 9–11 in combination with the drying machine set of a paper making machine.

FIG. 23 shows how one of the described basically sponding to drying cylinder 248, could replace a drying cylinder of an otherwise unaltered drying aggregate of an available paper making machine and which can be arranged on its stand in a way not specially shown here and without requirement of displacing the remaining usual drying cylinder 248'.

The invention is not confined to all details in the described design form examples. The appliance may be used in a different way from that described, e.g., the running direction of the material line indicated in FIG. 7 could be reversed and the pressure medium supply correspondingly regulated in the opposite way, which can mean better adaption to existing plane for the production of the material line. Again, the appliance can be used for width shrinking instead of width stretching if the direction of the rotation of the cylinder is reversed or the pressure stages of the pressure cabinet increase opposite to the direction of rotation of the cylinder 348. The bands 205 and 205a could be made longitudinally stretchable instead of horizontally stretchable by fitting unstretchable bands in its crosswise direction, in which case the appliance is usable for longitudinal stretching or longitudinal shrinking. On leaving out the cable altogether, simultaneous longitudinal and width stretching or simultaneous longitudinal and width shrinking is possible and, by varying the deformability of and/or thickness of the bands 205 and 205a, any desired combination effect can be made on the material line, which may take the form of one or a series of sheets of cardboard instead of a single continuous line of material.

A simplified version of the appliance as shown in FIG. 9 is obtained by leaving out the couch rollers 278 and the slide belt 261. This may be, done if the pressure plates are provided with friction-reducing layers (e.g., nylon or teflon) at their outside surfaces facing cylinder 248 or if these outer surfaces are hard chromed and/or highly polished. Adjustability of the bearings 253, 263, and 264 in direction of the arrows 266 of FIG. 9 can also be left out if special guide rollers 220 are provided for the bands 205, 205a and 261 as indicated by the dot-dash drawing (220) in FIG. 9. Finally, roller wheels 384 could have roller bearings on the bearing stud 385.

Even if the process is suited to and primarily intended for the width stretching or width shrinking of lines of paper sheet and the appliance is equipped with flexible stretchable bands having worked-in cables as in FIGS. 6, 8, and 11 adaptation by the use of bands of differing design can enable it to be used for longitudinal shrinking or longitudinal stretching or combined shrinking or stretching (two way shrinking/stretching) of lines of material.

I claim:

1. A process for mechanically compacting or shrinking a continuous web comprising:
    moving said continuous web past an operating station, compressing said continuous web, at right angles to the plane thereof, between two pressure members, at least one of which pressure members contacts said continuous web over a portion thereof and moves, together with said web, past said operating station, intermittently varying the pressure, in a number of successive stages, by controlling fluid pressure applied to said pressure members, while translating the pressure applied normally to the plane of said web to uniformly-applied forces, acting in the plane of said web, at least in the direction of travel of said continuous web.

2. A process as defined in claim 1 wherein said pressure is successively increased in the direction of movement of said continuous web.

3. A process as defined in claim 1 wherein said pressure is successively decreased in the direction of movement of said continuous web.

4. A process as defined in claim 1 further including the step of additionally increasing the width of said portion of said band in contact with said continuous web by gripping the edges thereof.

5. An apparatus for stretching or shrinking a continuous web moving past an operating station, comprising
    an endless flexible stretchable band mounted on one side of said continuous web in contact with the surface thereof,
    means for moving said band at the speed of movement of said continuous web including roller means for supporting and driving said band,
    pressure cabinet means enclosed by said endless band and in contact with the inner surface of the portion thereof contacting said continuous web including a plurality of sequentially arranged pressure chambers having one wall thereof formed by said band,
    pressure means for applying a pressure fluid to said pressure chambers to deform said stretchable band, thereby compressing said continuous web, and
    pressure control means for producing a consecutive pressure differential between said pressure chambers.

6. An apparatus as defined in claim 5 further including a drying cylinder at said operating station, said continuous web passing around said drying cylinder and having one surface in contact therewith, said endless band being in contact with the other surface of said continuous web.

7. An apparatus as defined in claim 5 further including second pressure cabinet means and a second endless flexible stretchable band surrounding said second pressure cabinet means and contacting the side of said continuous web opposite said endless band, said pressure cabinet means being controlled in a coordinate manner by said pressure control means.

8. An apparatus as defined in claim 5 wherein said endless stretchable band includes a plurality of unstretchable cords embedded in said band and extending in the longitudinal direction thereof so as to permit stretching of the band only in the transverse direction thereof.

9. An apparatus as defined in claim 5 wherein said pressure means includes gaseous pressure supply means providing a gaseous medium and a lubrication distribution means for injecting a lubricant into said gaseous medium.

10. An apparatus as defined in claim 5 further including bearings for said rollers, means for adjustably supporting said bearings on said pressure cabinet means and support frame means including movable support arms connected to said pressure cabinet means for effecting movement of said cabinet means toward and away from said continuous web.

11. An apparatus as defined in claim 5 further including flexible hose means positioned along the sides of each pressure cabinet means in contact therewith and with the edge of said band, and means for inflating said hose means into pressure contact with the edge of said band.

12. An apparatus as defined in claim 5 further including strap means secured to the edges of said stretchable band extending beyond said continuous web and adjustable grip means connected to said strap means for urging said band outwardly on both sides thereof.

13. An apparatus as defined in claim 5 further including a woven fabric insert positioned within the edge zone of said band so as to make said edge zones unstretchable.

14. An apparatus as defined in claim 5 wherein said pressure chamber means includes an inflatable container virtually filling each pressure chamber and intermediate layer means positioned between said band and said inflatable containers for reducing the friction therebetween.

15. An apparatus as defined in claim 7 wherein said second stretchable band has different deformability properties from those said first band.

16. An apparatus as defined in claim 5 wherein said stretchable band is provided at the surface contacting said continuous web with a moisture absorbing layer, and layer drying means associated with said band at the point at which it separates from said continuous web.

17. An apparatus as defined in claim 16 wherein said moisture absorbing layer is a felt layer having a thin rubber layer bonded thereto, said moisture absorbing layer being pinned to said band.

References Cited

UNITED STATES PATENTS

| | | | |
|---|---|---|---|
| 2,078,904 | 4/1937 | Cluett | 26—18.6 |
| 2,174,744 | 10/1939 | Hill | 34—115 |
| 3,131,118 | 4/1964 | Dabroski et al. | 162—361 |
| 3,319,352 | 5/1967 | Haigh | 34—123 |
| 3,269,893 | 8/1966 | Rojecki | 162—358 X |

FOREIGN PATENTS 955,363  4/1964  Great Britain.

S. LEON BASHORE, Primary Examiner

U.S. Cl. X.R.

26—18.6; 34—116, 123; 162—205, 361